United States Patent
Hongou

(10) Patent No.: US 9,712,251 B2
(45) Date of Patent: Jul. 18, 2017

(54) DISTORTION COMPENSATION DEVICE AND COMPENSATION DISTORTION METHOD

(71) Applicant: FUJITSU LIMITED, Kawasaki-shi, Kanagawa (JP)

(72) Inventor: Hironobu Hongou, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/836,565

(22) Filed: Aug. 26, 2015

(65) Prior Publication Data

US 2016/0094296 A1 Mar. 31, 2016

(30) Foreign Application Priority Data

Sep. 26, 2014 (JP) .................................. 2014-197517

(51) Int. Cl.

| H04B 10/588 | (2013.01) |
|---|---|
| H04B 10/2507 | (2013.01) |
| H04B 10/58 | (2013.01) |
| H04L 25/08 | (2006.01) |
| H04B 10/079 | (2013.01) |

(52) U.S. Cl.
CPC ......... H04B 10/58 (2013.01); H04B 10/0799 (2013.01); H04B 10/2507 (2013.01); H04B 10/588 (2013.01); H04L 25/08 (2013.01)

(58) Field of Classification Search
CPC .................... H04B 10/588; H04B 10/2507
See application file for complete search history.

(56) References Cited

U.S. PATENT DOCUMENTS

| 2008/0152037 A1 | 6/2008 | Kim et al. | |
|---|---|---|---|
| 2009/0104882 A1* | 4/2009 | Suzuki | H03F 1/3294 455/114.3 |
| 2009/0245809 A1* | 10/2009 | Nakamoto | H04B 10/2507 398/159 |
| 2012/0280844 A1 | 11/2012 | Abe et al. | |
| 2015/0372766 A1* | 12/2015 | Yoshida | H04B 10/2507 398/193 |

FOREIGN PATENT DOCUMENTS

| JP | 08-307465 A | 11/1996 |
|---|---|---|
| JP | 11-345054 A | 12/1999 |
| JP | 2001-94617 A | 4/2001 |
| JP | 2010-518660 A | 5/2010 |
| JP | 2013-81227 A | 5/2013 |

* cited by examiner

*Primary Examiner* — Nathan Curs
(74) *Attorney, Agent, or Firm* — Arent Fox LLP

(57) ABSTRACT

A distortion compensation device includes: a signal processing unit to perform signal processing on a symbol; a storage unit to store a distortion compensation value for every pattern string including a symbol of interest and predetermined number of symbols ahead of the symbol of interest among a plurality of input symbols, a distortion in the signal processing unit being compensated for such that the symbol of interest is corrected to a target value based on the distortion compensation value; a first acquisition unit to acquire a pattern string of interest including the current input symbol and the predetermined number of input symbols ahead of the current input symbol; a second acquisition unit to acquire the distortion compensation value associated with the pattern string of interest from the storage unit; and a setting unit to set the distortion compensation value to a correction value of the signal processing unit.

5 Claims, 12 Drawing Sheets

DISTORTION COMPENSATION DEVICE AND COMPENSATION DISTORTION METHOD

CROSS-REFERENCE TO RELATED APPLICATION

This application is based upon and claims the benefit of priority from the prior Japanese Patent Application No. 2014-197517, filed on Sep. 26, 2014, the entire contents of which are incorporated herein by reference.

FIELD

The embodiments discussed herein are related to a distortion compensation device and a compensation distortion method.

BACKGROUND

The modulation schemes used in the optical transmission field is making transition from the dual polarization quadrature phase shift keying (DP-QPSK) scheme to multi-level quadrature amplitude modulation (QAM) scheme. In a PSK scheme, symbol information represented as signals of "0" or "1" is transmitted. In contrast, in a 16-QAM scheme, symbol information represented as I and Q signals each having four values is transmitted. Accordingly, an optical transmission apparatus employing the 16-QAM scheme requires low distortion characteristics in a signal processing unit such as a digital-to-analog converter (DAC), an amplifier and an electrical-to-optical (E/O) converter. Therefore, in the optical transmission field, there is a need for a circuit that can compensate for the distortions of an output waveform in a signal processing unit at the electrical domain.

In the present state of the art of optical transmission area, there have been known a frequency correction in which an equalizer (EQ) compensates for the falling of frequency in an output waveform by applying reverse frequency characteristics, and a non-linear correction in which a linearizer compensates for the saturation characteristics of a DAC or an amplifier by applying reverse saturation characteristics. In addition, by using an EQ or a linearizer, it is possible to correct a distortion in an output waveform caused by frequency characteristics or saturation characteristics of a signal processing unit such as an amplifier and a DAC.

In a distortion compensation circuit used in radio frequency transmission field, while the transmission signal is in the frequency range of 20 MHz, the operation frequency is approximately 200 MHz, which is ten times the frequency range. Nonetheless, it is relatively easy to prepare a circuit having the operation frequency of such level. Accordingly, since a sufficient operation frequency can be obtained in the distortion compensation circuit used in the radio frequency transmission field, the frequency compensation can be implemented simply by extracting a non-linear distortion in a high power amplitude (HPA) to compensate for the non-linear distortion.

Related technologies are disclosed in, for example, Japanese National Publication of International Patent Application No. 2010-518660, and Japanese Laid-Open Patent Publication No. 11-345054.

SUMMARY

According to an aspect of the invention, a distortion compensation device includes at least one storage configured to store a distortion compensation value for each pattern string of a plurality of pattern strings, each pattern string including a symbol positioned at an end of pattern string and a predetermined number of symbols positioned before the symbol positioned at the end of the pattern string, at least one memory storing instructions, and at least one processor that executes the instructions to provide a signal processing unit configured to perform signal processing on each pattern string of a plurality of pattern strings, a distortion in the signal processing unit being compensated by correcting the symbol positioned at the end of the pattern string to a target value based on the distortion compensation value, a first acquisition unit configured to, upon detecting the symbol positioned at the end of the pattern string or a symbol positioned next to the symbol positioned at the end of the pattern string, acquire a respective pattern string of the plurality of pattern strings that includes the symbol positioned at the end of the pattern string and the predetermined number of symbols, a second acquisition unit configured to acquire, from the at least one storage, the distortion compensation value that is associated with the respective pattern string of the plurality of pattern strings acquired by the first acquisition unit, and a setting unit configured to set a correction value of the signal processing unit, the correction value being based on the distortion compensation value acquired by the second acquisition unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a signal processing unit such as a DAC, an amplifier, and an O/E converter used in the optical transmission field, a transmission signal has a high frequency in the order of GHz, and the operation frequency is also in the order of GHz. Therefore, such a signal processing unit has to operate at almost its maximum performance. As a result, inherent characteristics of components, such as time rise Tr, time fall Tf, unbalance of Tr or Tf, delay, memory effect and thermal change have influence, so that the non-linear waveform distortions have to be compensated for all components of the optical transmission apparatus.

In a non-linear waveform distortion, distortion compensation values vary depending on whether an output waveform increases or decreases with varying symbols, or even depending on how symbols change. Accordingly, the frequency correction by an EQ or the non-linear correction by a linearizer may not sufficiently compensate for such waveform distortion. Moreover, in the optical transmission field, the transmission capacity is expected to increase and accordingly use frequency band of a transmission signal and operation frequency of the circuit are also expected to increase. Accordingly, unlike in the radio frequency transmission field, faster signal processing of complicated signals is required.

Hereinafter, embodiments of techniques to achieve stable distortion compensation will be described in detail with reference to accompanying drawings. It is to be understood that the present disclosure is not limited by the embodiments. It is also to be understood that embodiments described below may be combined in any non self-contradictory manner, thus producing further embodiments not explicitly mentioned herein.

First Embodiment

Figure 1:
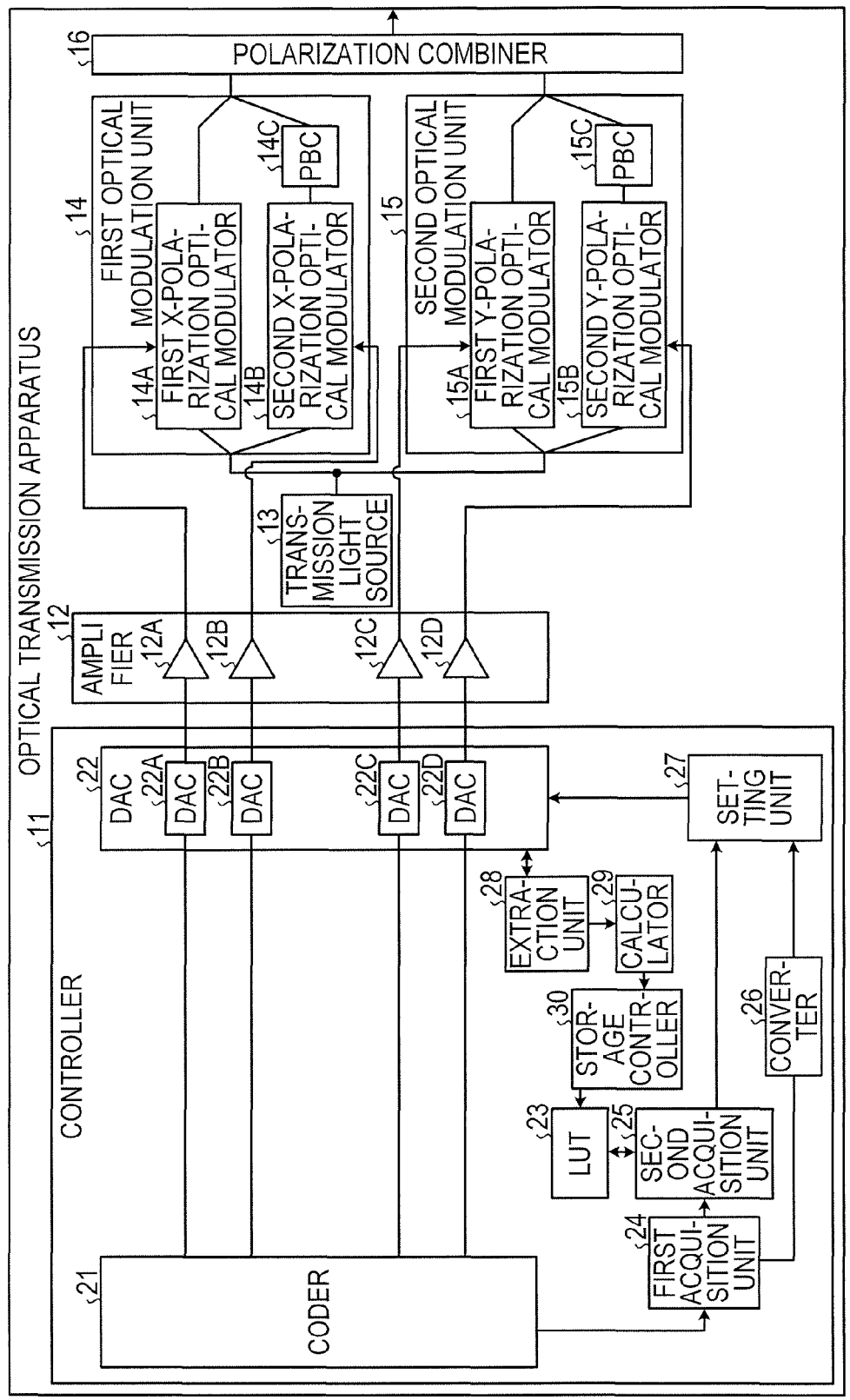
FIG. 1 is a block diagram for illustrating an example of an optical transmission apparatus according to a first embodiment.

An optical transmission apparatus 1 illustrated in FIG. 1 utilizes a digital coherent optical communication. The optical transmission apparatus 1 includes a controller 11, an amplifier unit 12, a transmission light source 13, a first optical modulation unit 14, a second optical modulation unit 15, and a polarization combiner 16.

The controller 11 controls the overall operation of the optical transmission apparatus 1 and also acts as a distortion compensator. The controller 11 includes a coder 21, a digital-to-analog converter (DAC) unit 22, a look-up table (LUT) 23, a first acquisition unit 24, a second acquisition unit 25, a converter 26, a setting unit 27, an extraction unit 28, a calculator 29, and a storage controller 30. The coder 21 encodes an information signal into four binary electric signals to output the signals. The DAC unit 22 is a signal processing unit and includes DACs 22A to 22D, each of which converts a binary electrical signal into an analog electrical signal. The LUT 23 stores distortion compensation values one for every pattern string of the DAC unit 22, each of which is used for the DAC unit 22 to perform analog conversion such that the symbol of interest in a pattern string is corrected to a target value. In addition, a pattern string is composed of five symbols in total that includes a current symbol and, for example, four symbols before the current symbol.

Figure 2:
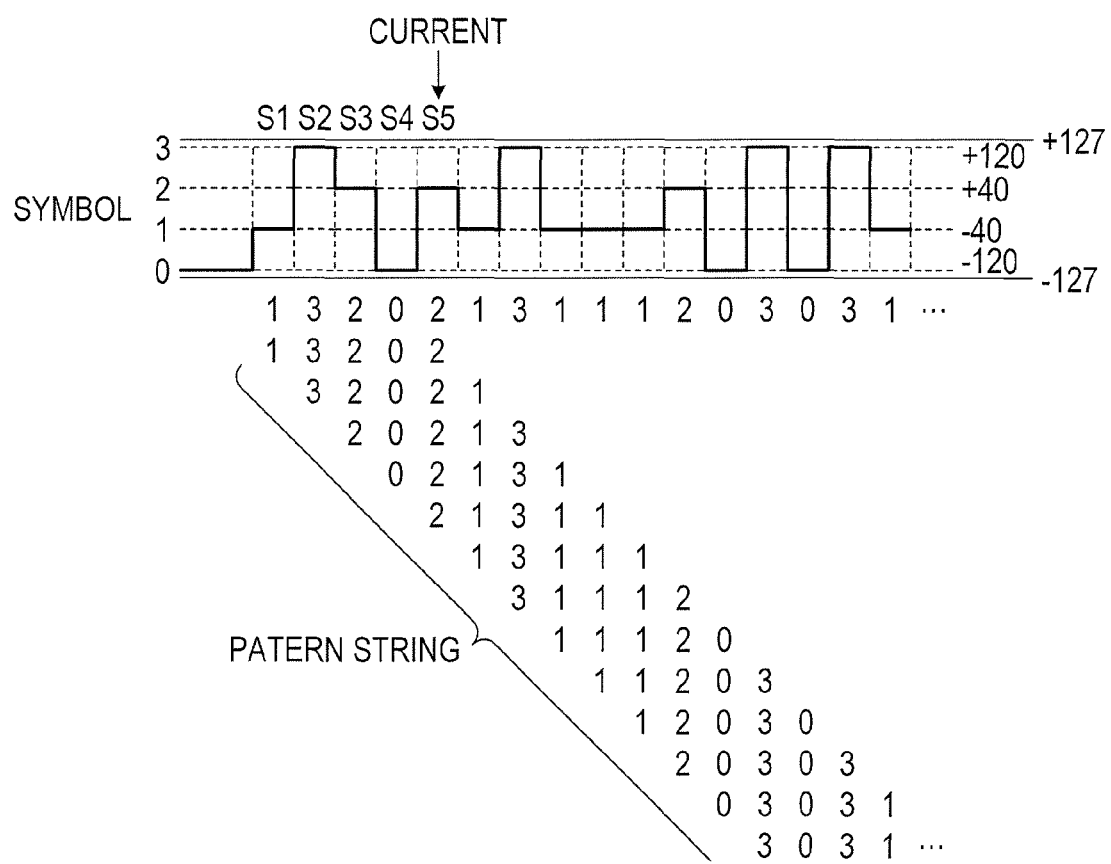
FIG. 2 is a diagram for illustrating an example of pattern strings.

FIG. 2 is a diagram for illustrating an example of pattern strings. There are four types of symbols including "0," "1," "2," and "3". Each of the pattern strings illustrated in FIG. 2 is composed of a combination of five symbols, and thus the total number of the pattern strings is 1,024 (4×4×4×4×4=1,024). The allowable setting range of the DAC unit 22 is, for example, from +127 to −127. The DAC setting value for symbol "3" is +120, the DAC setting value for symbol "2" is +40, the DAC setting value for symbol "1" is −40, and the DAC setting value for symbol "0" is −120, for example.

Figure 3:
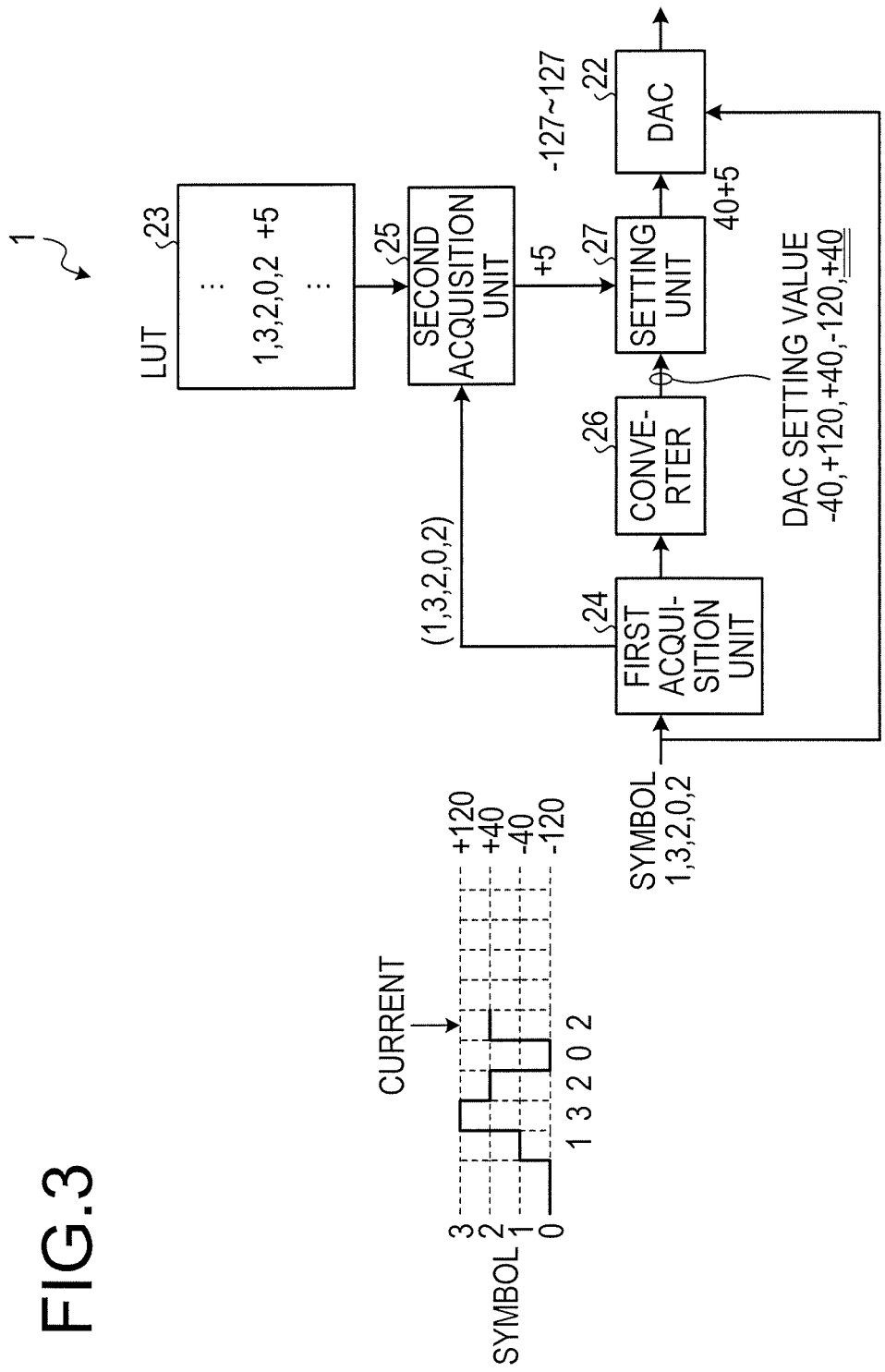
FIG. 3 is a diagram for illustrating an example of major elements of an optical transmission apparatus.

FIG. 3 is a diagram for illustrating an example of major elements of the optical transmission apparatus 1. The LUT 23 stores distortion compensation values of the DAC unit 22, each of the distortion compensation values is associated with a symbol of interest in the respective one of the 1,024 pattern strings. As used herein, a symbol of interest refers to the symbol positioned at the end of a pattern string. The LUT 23 calculates a distortion compensation value for a symbol of interest in every pattern string during a training process to be described below, and stores in advance the distortion compensation value.

During an operation process, upon detecting a current symbol S5, the first acquisition unit 24 acquires a pattern string of interest that includes the current symbol S5 and four symbols S4 to S1 before the current symbol S5. As illustrated in the example of FIG. 2, if the current symbol S5 is "2" and the four symbols S4 to S1 are "0," "2," "3," and "1," respectively, the first acquisition unit 24 acquires the pattern string of "13202." In this example, the symbol of interest (current symbol) in the pattern string of "13202" is the symbol of "2" positioned at the end of the pattern string.

The second acquisition unit 25 acquires a distortion compensation value associated with a pattern string of interest acquired by the first acquisition unit 24 from the LUT 23, and inputs the acquired distortion compensation value into the setting unit 27. That is, in the example of FIG. 2, the second acquisition unit 25 acquires the distortion compensation value of "+5" for the symbol of interest associated with the pattern string of interest of "13202."

The converter 26 converts a current symbol in a pattern string of interest into a DAC setting value to acquire it, and inputs the acquired DAC setting value into the setting unit 27. In the example of FIG. 2, the converter 26 acquires the DAC setting value of "+40" for the current symbol of "2" from the pattern string of 13202. Additionally, the converter 26 may convert the pattern string of 13202 into the DAC setting values of "−40," "+120," "+40," "−120," and "+40," respectively, and acquire the DAC setting value of "+40" for the current symbol "2."

The setting unit 27 adds the distortion compensation value of "+5" for the current symbol acquired by the second acquisition unit 25 to the DAC setting value of "+40" of the current symbol acquired by the converter 26 to calculate the DAC correction value of "+45," and sets the DAC correction value of the DAC unit 22 to "+45." As a result, the DAC unit 22 may output an output signal whose current symbol is corrected to the target value, i.e., an output signal whose waveform distortion has been compensated for, based on the DAC correction value.

The extraction unit 28 illustrated in FIG. 1 extracts an output signal from the DAC unit 22 associated with the current symbol in the pattern string of interest during the training process. The calculator 29 calculates a difference between the extracted output signal from the DAC unit 22, which corresponds to the current symbol, and a target value of the DAC unit 22. In addition, the calculator 29 calculates a distortion compensation value for changing the DAC setting value of the DAC unit 22 so that the calculated difference is zero. The storage controller 30 controls the LUT 23. The storage controller 30 stores the distortion compensation value for the current symbol calculated by the calculator 29 in the LUT 23 in association with the pattern string of interest containing the current symbol.

The amplifier 12 amplifies an output signal from the DAC unit 22. The transmission light source 13 is a laser device emitting an optical signal for transmission. The optical modulation unit 14 includes a first X-polarization optical modulator 14A, a second X-polarization optical modulator 14B, and a polarization beam combiner (PBC) 14C. The first X-polarization optical modulator 14A modulates an optical signal from the transmission light source 13 by using an electrical signal from a first amplifier 12A to output a first optical modulation signal. The second X-polarization optical modulator 14B modulates an optical signal from the transmission light source 13 by using an electrical signal from a second amplifier 12B to output a second optical modulation signal. The PBC 14C shifts the phase of the second optical modulation signal by ninety degrees. The first optical modulation unit 14 combines the first optical modulation signal and the phase-shifted, second optical modulation signal to output an X-polarization optical modulation signal.

The second optical modulation unit 15 includes a first Y-polarization optical modulator 15A, a second Y-polarization optical modulator 15B, and a PBC 15C. The first Y-polarization optical modulator 15A modulates an optical signal from the transmission light source 13 by using an electrical signal from a third amplifier 12A to output a third optical modulation signal. The second Y-polarization optical modulator 15B modulates an optical signal from the transmission light source 13 by using an electrical signal from a fourth amplifier 12D to output a fourth optical modulation signal. The PBC 14C shifts the phase of the fourth optical modulation signal by ninety degrees. The second optical modulation unit 15 combines the third optical modulation signal and the phase-shifted, fourth optical modulation signal to output a Y-polarization optical modulation signal.

The polarization combiner 16 receives the X-polarization optical modulation signal from the first optical modulation unit 14 and the Y-polarization optical modulation signal from the second optical modulation unit 15, and combines the X-polarization optical modulation signal and the Y-polarization optical modulation signal to output, for example, a polarization-multiplexed signal of 16-QAM.

Figure 4:
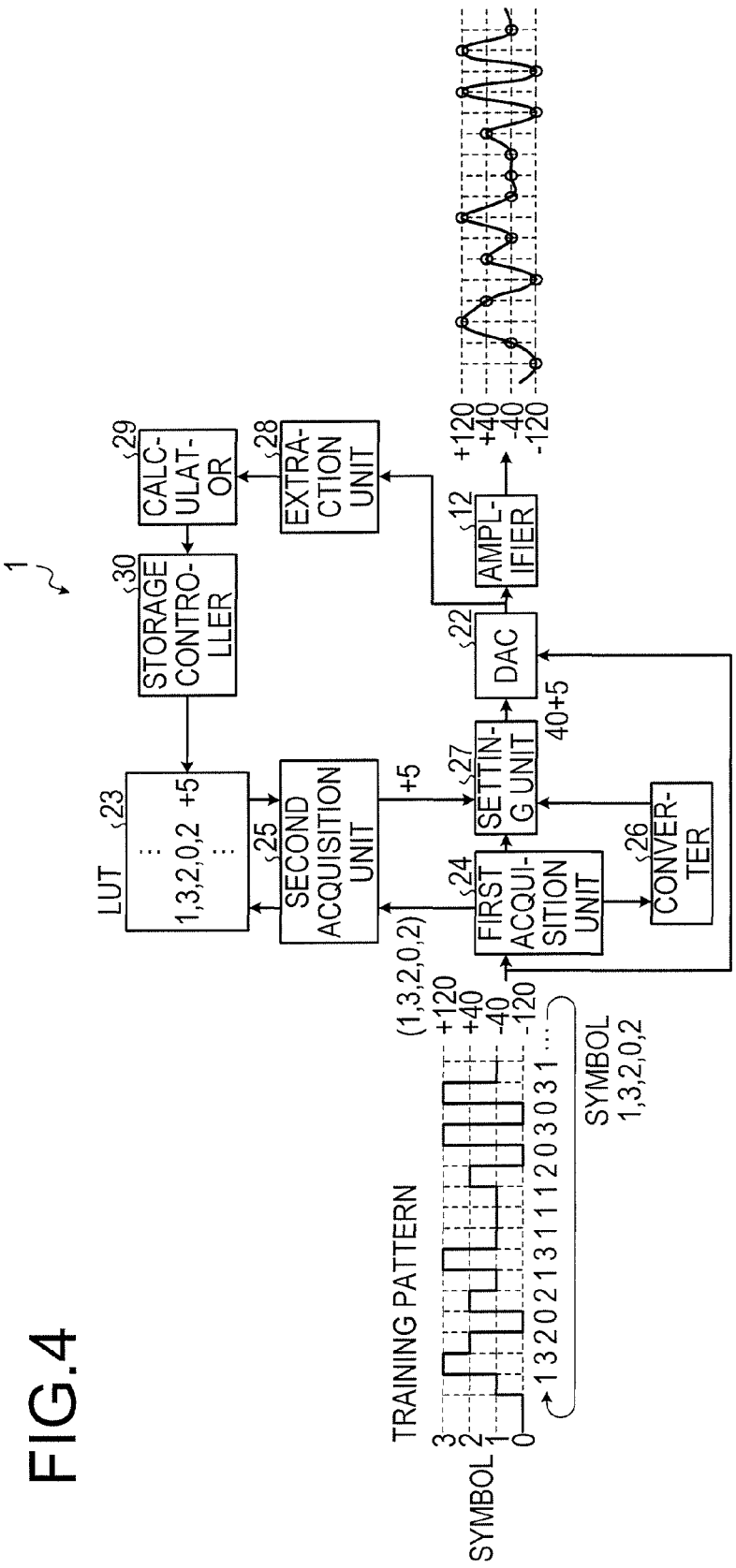
FIG. 4 is a diagram for illustrating an example of a training process of an optical transmission apparatus.

Next, the operation of the optical transmission apparatus 1 according to the first embodiment will be described. A training process of the optical transmission apparatus 1 will be described first. FIG. 4 is a diagram for illustrating an example of the training process of the optical transmission apparatus 1. In the training process illustrated in FIG. 4, a distortion compensation value for a symbol of interest in every pattern string is calculated based on a training pattern covering all pattern strings, and the calculated distortion compensation value is stored in the LUT 23. For convenience of illustration, it is assumed that a distortion compensation value is initially set to "0" in the LUT 23 before the training process. In addition, the coder 21 (not illustrated in FIG. 4) outputs the training pattern that sequentially outputs symbols of 1,024 pattern strings in response to a predetermined operation.

Upon detecting a current symbol based on the training pattern from the coder 21, the first acquisition unit 24 acquires a pattern string of interest composed of five symbols including the current symbol and four symbols before the current symbol. The first acquisition unit 24 cannot acquire any pattern string of interest until the first five symbols are detected, and thereafter sequentially acquires a pattern string of interest whenever a current symbol is detected. The second acquisition unit 25 acquires the distortion compensation value of "0" for the current symbol in the pattern string of interest from the LUT 23, and inputs the acquired distortion compensation value of "0" into the setting unit 27. The converter 26 converts the current symbol in the pattern string of interest into a DAC setting value to acquire the DAC setting value, and inputs the acquired DAC setting value into the setting unit 27.

The setting unit 27 adds the distortion compensation value of "0" for the current symbol to the DAC setting value of the current symbol to calculate a DAC correction value, and sets the DAC correction value of the DAC unit 22 to the calculated DAC correction value. Then, the DAC unit 22 converts the current symbol into an analog signal based on the DAC correction value and outputs an output signal. That is, since the distortion compensation value is "0", the DAC unit 22 outputs an output signal before distortion compensation which corresponds to the current symbol.

The extraction unit 28 extracts an output signal from the DAC unit 22 which corresponds to the current symbol. The calculator 29 calculates a difference between the output signal from the DAC unit 22 associated with the current symbol extracted by the extraction unit 28 and a target value of the DAC unit 22 associated with the current symbol, and calculates a distortion compensation value of the DAC unit 22 so that the difference is zero. Then, the storage controller 30 stores the distortion compensation value for the current symbol in the LUT 23 in association with the pattern string of interest containing the current symbol.

Upon detecting another current symbol of next, the optical transmission apparatus 1 acquires a pattern string of interest including the current symbol and four symbols before the current symbol. The optical transmission apparatus 1 calculates a distortion compensation value based on the difference between an output signal from the DAC unit 22 associated with the current symbol in the acquired pattern string of interest and the target value of the DAC unit 22. Then, the optical transmission apparatus 1 stores the distortion compensation value for the calculated current symbol in the LUT 23 in association with the pattern string of interest. For example, the optical transmission apparatus 1 may store distortion compensation values for symbol of interests in the LUT 23 in association with the respective 1,024 pattern strings.

Figure 5:
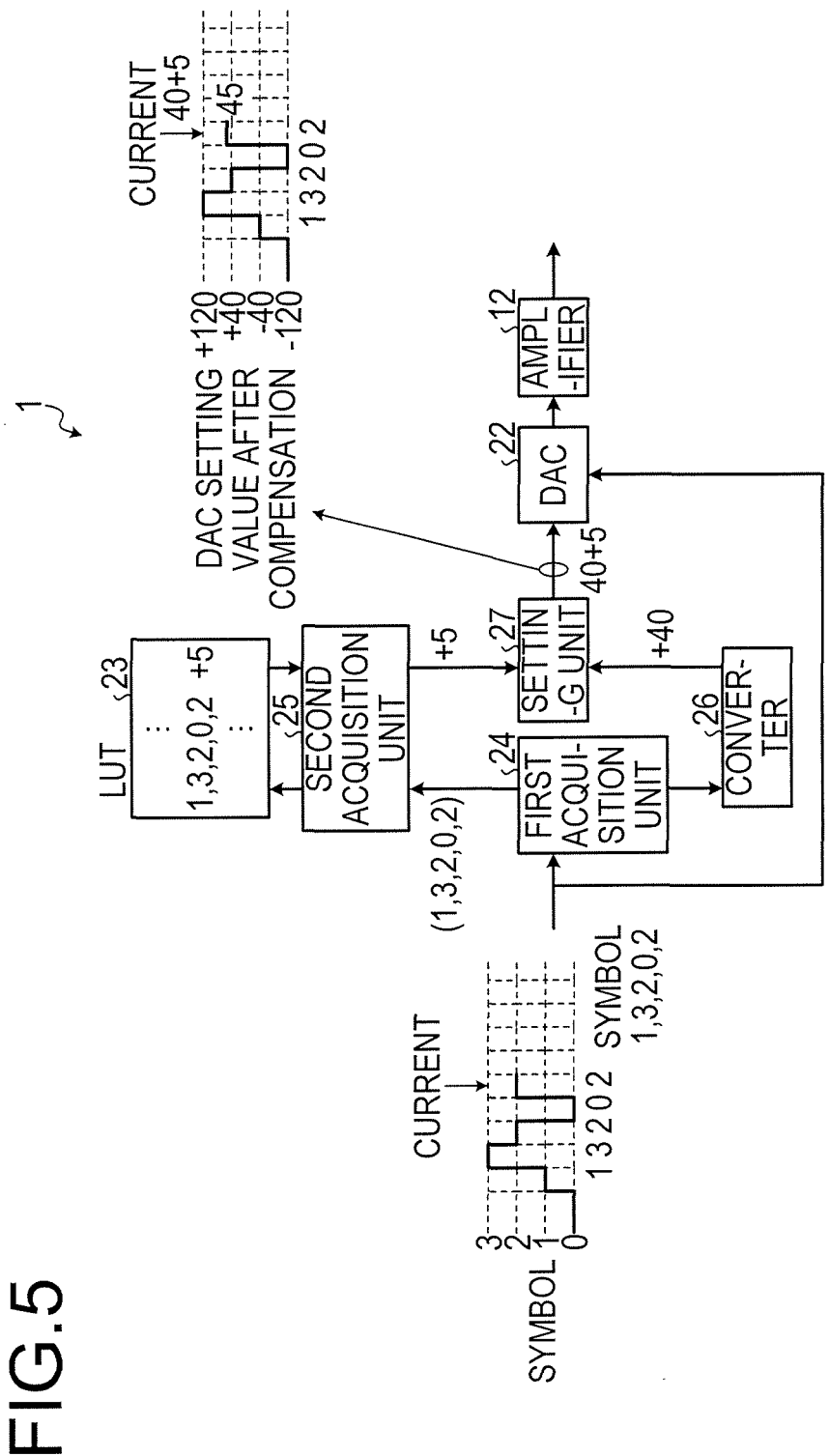
FIG. 5 is a diagram for illustrating an example of an operation process of an optical transmission apparatus.

Next, the operation process of the optical transmission apparatus 1 will be described. FIG. 5 is a diagram for illustrating an example of the operation process of the optical transmission apparatus 1. In the operation process illustrated in FIG. 5, upon detecting a current symbol, a pattern string including the current symbol and four symbols before the current symbol are acquired, and the DAC correction value of the DAC unit 22 is set to a distortion compensation value for the current symbol in the acquired pattern string. Upon detecting a current symbol from the coder 21, the first acquisition unit 24 acquires a pattern string of interest including the current symbol and four symbols before the current symbol. The second acquisition unit 25 looks up the LUT 23 and acquires a distortion compensation value for the current symbol associated with the pattern string of interest from the LUT 23. In addition, the converter 26 converts the current symbol in the pattern string of interest into a DAC setting value to acquire it.

The setting unit 27 adds the distortion compensation value of "+5" for the current symbol acquired from the second acquisition unit 25 to the DAC setting value of "+40" for the current symbol acquired from the converter 26 to calculate the DAC correction value of "+45" and sets the DAC correction value of the DAC unit 22 to "+45." The DAC unit 22 converts the current symbol into an analog signal based on the DAC correction value of "+45," and outputs an output signal whose current symbol is corrected to the target value, i.e., an output signal whose waveform distortion has been compensated for.

The optical transmission apparatus 1, according to the first embodiment, calculates distortion compensation values for every pattern string in all combinations during the training process, and stores the distortion compensation values for every pattern string in the LUT 23. In the operation process, the optical transmission apparatus 1, upon detecting a current symbol, acquires a pattern string of interest containing the current symbol, acquires the distortion compensation value for the current symbol associated with the pattern string of interest from the LUT 23, and sets the DAC correction value of the DAC unit 22 to the distortion compensation value. Then, the DAC unit 22 may output an output signal of the target value corresponding to the current symbol, based on the distortion compensation value. As a result, the optical transmission apparatus 1 can compensate for a waveform distortion in non-linear components of the DAC unit 22 at the electrical domain.

As the optical transmission apparatus 1 stores distortion compensation values for every pattern string in the LUT 23, it does not require any complicated algorithm for calculating coefficients of a digital filter such as an EQ and a linearizer. In addition, processing burden can be reduced and the circuit can also be downsized. Moreover, the transmission rate can be increased.

Although a distortion compensation value is calculated based on a difference between the output signal from the DAC unit 22 and the target value of the DAC unit 22 in the optical transmission apparatus 1 according to the first embodiment, the present disclosure is not limited thereto. A distortion compensation value may be calculated in different ways, as will be described with respect to a second embodiment.

Second Embodiment

Figure 6:
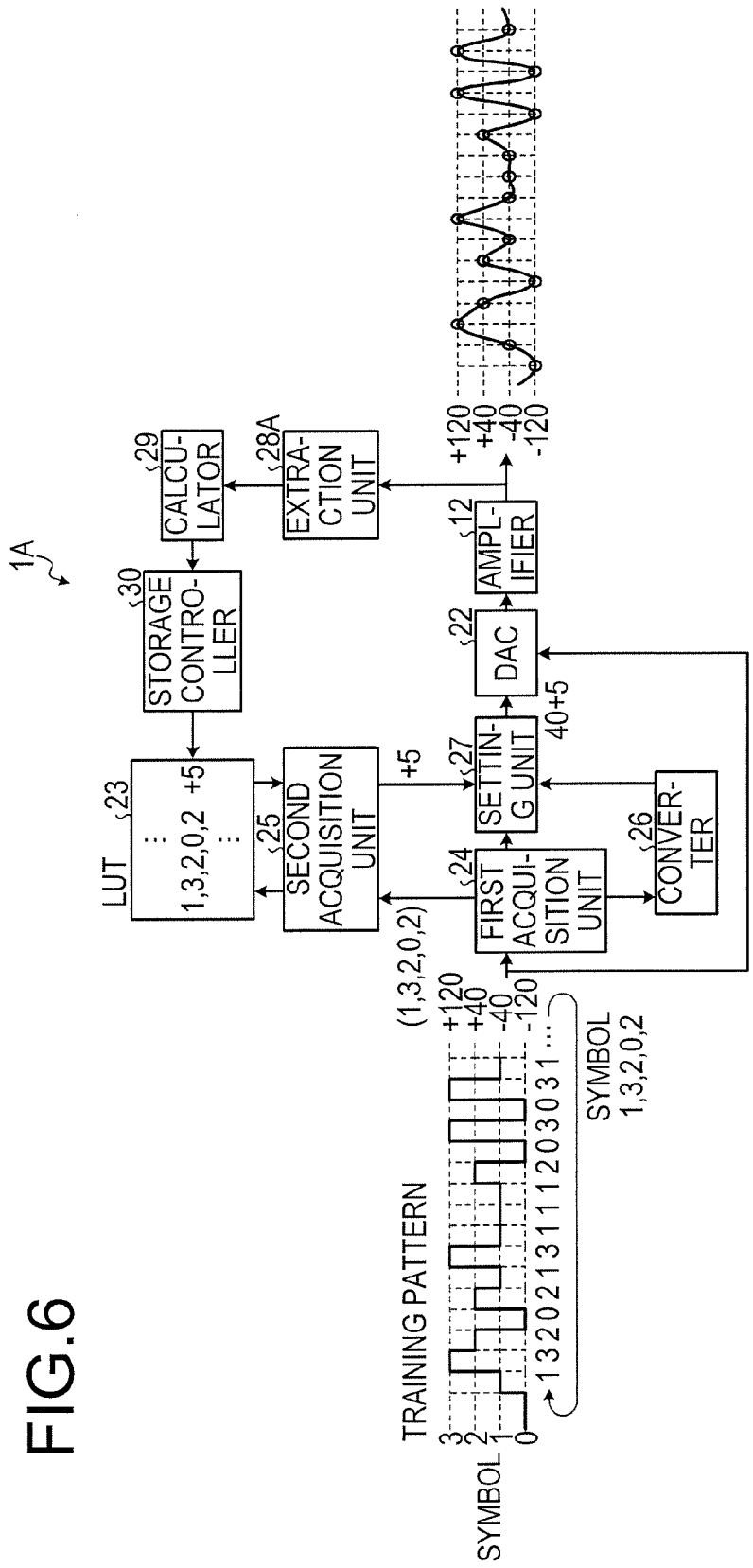
FIG. 6 is a diagram for illustrating an example of an optical transmission apparatus according to a second embodiment.

FIG. 6 is a diagram for illustrating an example of an optical transmission apparatus 1A according to a second embodiment. The same reference numerals to those used in FIG. 1 denote the same elements, and redundant descriptions of such elements will not be repeated.

The optical transmission apparatus 1A illustrated in FIG. 6 is different from the optical transmission apparatus 1 illustrated in FIG. 1 in that the former extracts an output signal from the amplifier 12 instead of the DAC unit 22, and calculates a distortion compensation value for a current symbol of the DAC unit 22 based on a difference between the extracted output signal and a target value of the amplifier 12.

An extraction unit 28A extracts an output signal from the amplifier 12 which corresponds to a current symbol. The calculator 29 calculates a difference between the extracted output signal from the amplifier 12 and a target value of the amplifier 12, and calculates a distortion compensation value of the DAC unit 22 so that the calculated difference is zero. The storage controller 30 stores the distortion compensation value associated with a pattern string containing the current symbol in the LUT 23.

Next, the operation of the optical transmission apparatus 2 according to the first embodiment will be described. A training process of the optical transmission apparatus 1A according to the second embodiment will be described first. Upon detecting a current symbol based on a training pattern, the first acquisition unit 24 acquires a pattern string of interest including the current symbol and four symbols before the current symbol. The second acquisition unit 25 acquires the distortion compensation value of "0" for the current symbol in the pattern string of interest from the LUT 23, and inputs the acquired distortion compensation value of "0" into the setting unit 27. The converter 26 converts the current symbol in the pattern string of interest into a DAC setting value to acquire it, and inputs the acquired DAC setting value into the setting unit 27.

The setting unit 27 adds the distortion compensation value of "0" for the current symbol to the DAC setting value of the current symbol to calculate a DAC correction value, and sets the DAC correction value of the DAC unit 22 to the calculated DAC correction value. Then, the DAC unit 22 converts the current symbol into an analog signal based on the DAC correction value and outputs an output signal. That is, since the distortion compensation value is "0," the DAC unit 22 outputs an output signal before distortion compensation associated with the current symbol.

An extraction unit 28A extracts an output signal from the amplifier 12 which corresponds to a current symbol. The calculator 29 calculates a difference between the extracted output signal from the amplifier 12 and a target value of the amplifier 12, and calculates a distortion compensation value of the DAC unit 22 so that the calculated difference is zero. The storage controller 30 stores the calculated distortion compensation value for the current symbol in the LUT 23 in association with the pattern string containing the current symbol. That is, the optical transmission apparatus 1A may calculate a distortion compensation value for a current symbol in a pattern string from an output signal from the amplifier 12 and store distortion compensation values for the respective 1,024 pattern strings in the LUT 23.

Next, the operation process of the optical transmission apparatus 1A will be described. Upon detecting a current symbol from the coder 21, the first acquisition unit 24 acquires a pattern string of interest including the current symbol and four symbols before the current symbol. The second acquisition unit 25 looks up the LUT 23 and acquires a distortion compensation value associated with the pattern string of interest. In addition, the converter 26 converts the current symbol in the pattern string of interest into a DAC setting value to acquire it.

The setting unit 27 adds the distortion compensation value for the current symbol acquired from the second acquisition unit 25 to the DAC setting value for the current symbol acquired from the converter 26 to calculate the DAC correction value. In addition, the setting unit 27 sets the DAC correction value of the DAC unit 22 to the calculated DAC correction value. The DAC unit 22 converts the current symbol into an analog signal based on the DAC correction value and outputs an output signal of the target value corresponding to the current symbol.

The optical transmission apparatus 1A according to the second embodiment calculates distortion compensation values for every pattern string in all combinations during the training process based on an output signal from the amplifier 12, and stores the distortion compensation values for every pattern string in the LUT 23. In the operation process, the optical transmission apparatus 1, upon detecting a current symbol, acquires a pattern string of interest containing the current symbol, acquires a distortion compensation value for the current symbol associated with the pattern string of interest from the LUT 23, and sets the DAC correction value of the DAC unit 22 to the distortion compensation value. Then, the DAC unit 22 may output an output signal of the target value corresponding to the current symbol from the amplifier 12 based on the distortion compensation value. As a result, the optical transmission apparatus 1A can compensate for a waveform distortion in non-linear components of the DAC unit 22 and the amplifier 12 at the electrical domain.

Third Embodiment

Figure 7:
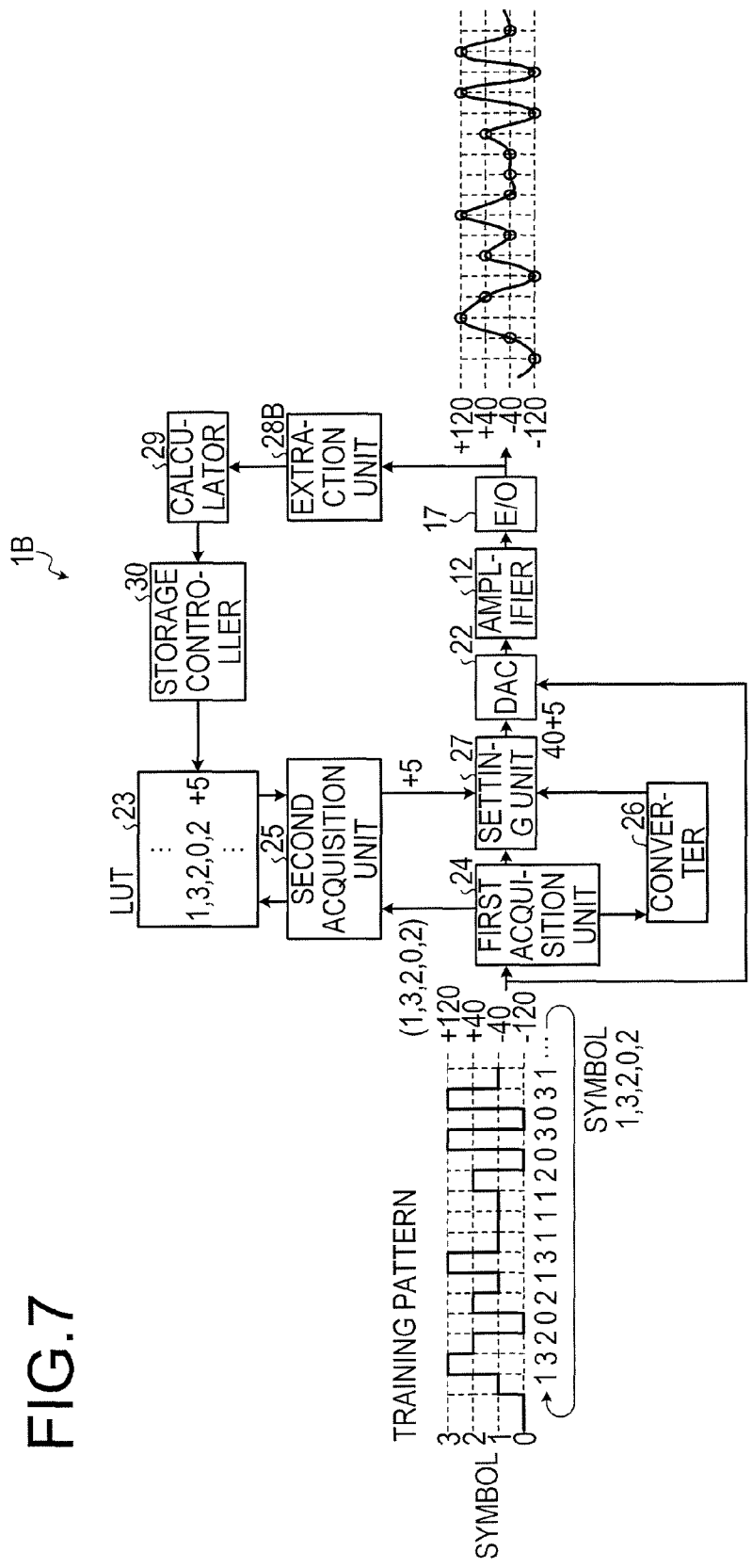
FIG. 7 is a diagram for illustrating an example of an optical transmission apparatus according to a third embodiment.

FIG. 7 is a diagram for illustrating an example of an optical transmission apparatus 1B according to a third embodiment. The same reference numerals to those used in FIG. 1 denote the same elements, and redundant descriptions of such elements will not be repeated.

The optical transmission apparatus 1B illustrated in FIG. 7 is different from the optical transmission apparatus 1 illustrated in FIG. 1 in that the former extracts an output signal from an E/O converter 17 instead of the DAC unit 22 and calculates a distortion compensation value for a current symbol of the DAC unit 22 based on a difference between the extracted output signal and a target value of the E/O converter 17. The E/O converter 17 includes, for example, a first X-polarization optical modulator 14A, a second X-polarization optical modulator 14B, a first Y-polarization optical modulator 15A, and a second Y-polarization optical modulator 15B.

An extraction unit 28B extracts an output signal from the E/O converter 17 which corresponds to the current symbol. The calculator 29 calculates a difference between the extracted output signal from the E/O converter 17 and a target value of the E/O converter 17, and calculates a distortion compensation value of the DAC unit 22 so that the calculated difference is zero. The storage controller 30 stores the distortion compensation value associated with a pattern string containing the current symbol in the LUT 23.

Next, the operation of the optical transmission apparatus 1B according to the third embodiment will be described. A training process of the optical transmission apparatus 1B according to the third embodiment will be described first. Upon detecting a current symbol based on a training pattern, the first acquisition unit 24 acquires a pattern string of interest including the current symbol and four symbols before the current symbol. The second acquisition unit 25 acquires the distortion compensation value of "0" for the current symbol in the pattern string of interest from the LUT 23, and inputs the acquired distortion compensation value of "0" into the setting unit 27. The converter 26 converts the current symbol in the pattern string of interest into a DAC setting value to acquire it, and inputs the acquired DAC setting value into the setting unit 27.

The setting unit 27 adds the distortion compensation value of "0" for the current symbol to the DAC setting value of the current symbol to calculate a DAC correction value, and sets the DAC correction value of the DAC unit 22 to the calculated DAC correction value. Then, the DAC unit 22 converts the current symbol into an analog signal based on the DAC correction value and outputs an output signal. That is, since the distortion compensation value is "0," the DAC unit 22 outputs an output signal before distortion compensation associated with the current symbol.

An extraction unit 28B extracts an output signal from the E/O converter 17 which corresponds to the current symbol. The calculator 29 calculates a difference between the extracted output signal from the E/O converter 17 and a target value of the E/O converter 17, and calculates a distortion compensation value of the DAC unit 22 so that the calculated difference is zero. The storage controller 30 stores the calculated distortion compensation value for the current symbol in the LUT 23 in association with the pattern string of interest containing the current symbol. That is, the optical transmission apparatus 1B may calculate a distortion compensation value for a current symbol in a pattern string from an output signal from the E/O converter 17 and store distortion compensation values for the respective 1,024 pattern strings in the LUT 23.

Next, the operation process of the optical transmission apparatus 1B will be described. Upon detecting a current symbol from the coder 21, the first acquisition unit 24 acquires a pattern string of interest including the current symbol and four symbols before the current symbol. The second acquisition unit 25 looks up the LUT 23 and acquires a distortion compensation value for the current symbol in the pattern string of interest. In addition, the converter 26 converts the current symbol in the pattern string of interest into a DAC setting value to acquire it.

The setting unit 27 adds the distortion compensation value for the current symbol acquired from the second acquisition unit 25 to the DAC setting value for the current symbol acquired from the converter 26 to calculate the DAC correction value. In addition, the setting unit 27 sets the DAC correction value of the DAC unit 22 to the calculated DAC correction value. The DAC unit 22 converts the current symbol into an analog signal based on the DAC correction value and outputs an output signal of the target value corresponding to the current symbol.

The optical transmission apparatus 1B according to the third embodiment calculates distortion compensation values for every pattern string in all combinations during the training process based on an output signal from the E/O converter 17, and stores the distortion compensation values for every pattern string in the LUT 23. During the operation process, the optical transmission apparatus 1, upon detecting a current symbol, acquires a pattern string of interest containing the current symbol, acquires a distortion compensation value for the current symbol associated with the pattern string of interest from the LUT 23, and sets the DAC correction value of the DAC unit 22 to the distortion compensation value. Then, the DAC unit 22 may output an output signal of the target value corresponding to the current symbol from the E/O converter 17 based on the distortion compensation value. As a result, the optical transmission apparatus 1B can compensate for a waveform distortion in non-linear components of the DAC unit 22, the amplifier 12 and the E/O converter 17 at the electrical domain.

The optical transmission apparatus 1 according to the first embodiment looks up the LUT 23 in which distortion compensation values are stored in association with respective pattern strings each including a current symbol and four symbols before the current symbol, and sets the DAC correction value of the DAC 22 to the distortion compensation value associated with the pattern string containing the current symbol. However, distortions in the signal processing units such as the DAC 22, the amplifier 12 and the E/O converter 17 are affected by ambient temperature. To cope with this, distortion compensation values for every pattern string may be stored taking into account the ambient temperatures, as will be described below with reference to a fourth embodiment.

Fourth Embodiment

Figure 8:
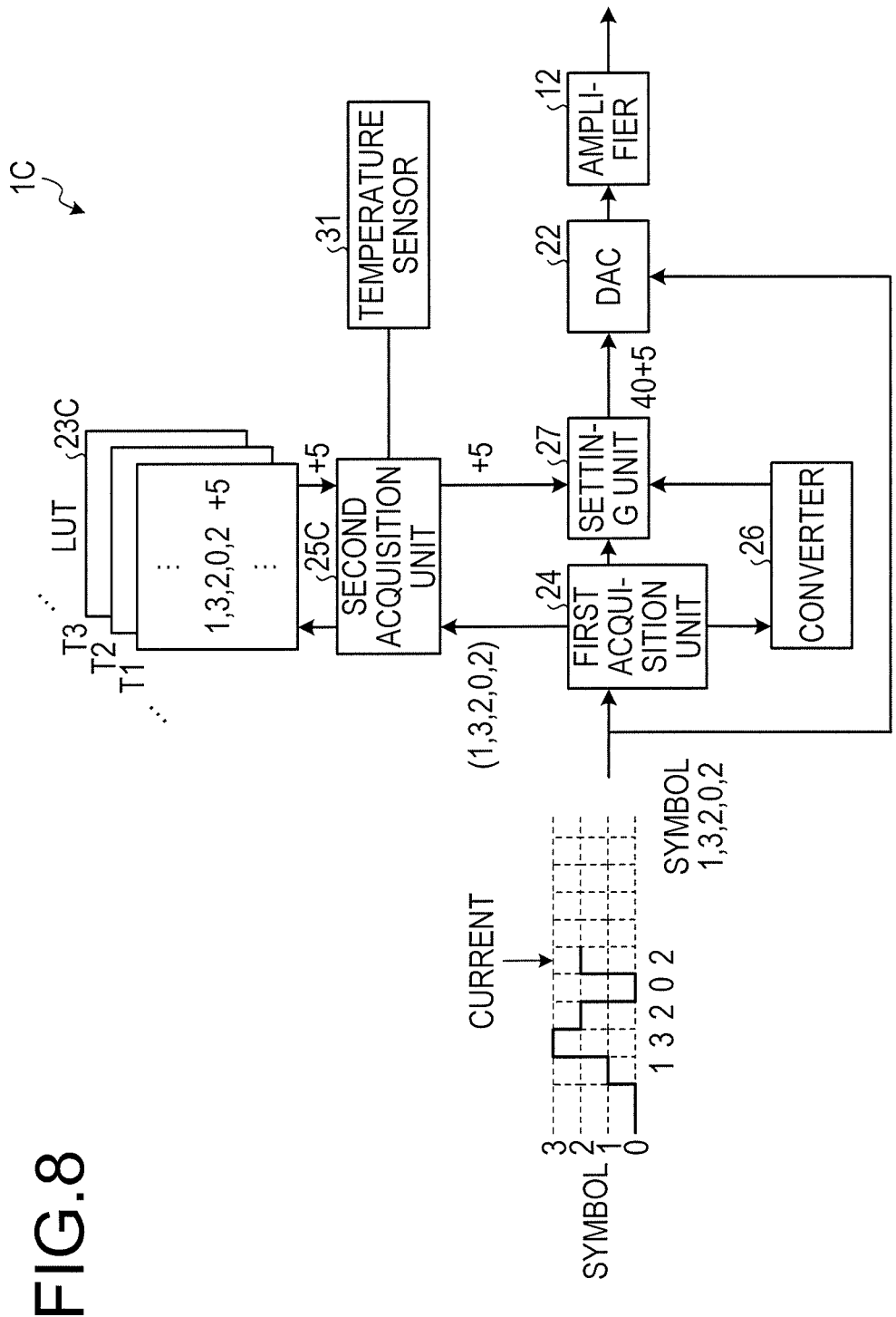
FIG. 8 is a diagram for illustrating an example of an optical transmission apparatus according to a fourth embodiment.

FIG. 8 is a diagram for illustrating an example of an optical transmission apparatus 1C according to a fourth embodiment. The same reference numerals to those used in FIG. 1 denote the same elements, and redundant descriptions of such elements will not be repeated.

The optical transmission apparatus 1C illustrated in FIG. 8 is different from the optical transmission apparatus 1 illustrated in FIG. 1 in that the former includes LUTs 23C having stored therein distortion compensation values for every pattern string for different ambient temperatures and measures a current temperature to select one of the LUTs 23C for the current temperature.

The optical transmission apparatus 1C includes, for example, a temperature sensor 31 for measuring the ambient temperature of the DAC unit 22. The LUT 23C stores distortion compensation values for every pattern string in association with the ambient temperatures T1, T2, . . . and so on. The second acquisition unit 25C measures an ambient temperature via the temperature sensor 31 and selects the LUT 23C for the measured ambient temperature among the LUTs 23C storing distortion compensation values for the current symbols in the pattern strings, which can be applied at the measured ambient temperature. In addition, a second acquisition unit 25C acquires a distortion compensation value associated with the pattern string containing the current symbol from the selected LUT 23.

Next, the operation of the optical transmission apparatus 1C according to the fourth embodiment will be described. A training process of the optical transmission apparatus 10 will be described first. Upon detecting a current symbol based on a training pattern, the first acquisition unit 24 acquires a pattern string of interest including the current symbol and four symbols before the current symbol. The second acquisition unit 25 acquires the distortion compensation value of "0" for the current symbol in the pattern string of interest from the LUT 23C for the current ambient temperature, and inputs the acquired distortion compensation value of "0" into the setting unit 27. The converter 26 converts the current symbol in the pattern string of interest into a DAC setting value to acquire it, and inputs the acquired DAC setting value into the setting unit 27.

The setting unit 27 adds the distortion compensation value of "0" for the current symbol to the DAC setting value of the current symbol to calculate a DAC correction value, and sets the DAC correction value of the DAC unit 22 to the calculated value. Then, the DAC unit 22 converts the current symbol into an analog signal based on the DAC correction value and outputs an output signal. That is, since the distortion compensation value is "0," the DAC unit 22 outputs an output signal before distortion compensation associated with the current symbol.

An extraction unit 28A extracts an output signal from the amplifier 22 which corresponds to a current symbol. The calculator 29 calculates a difference between the extracted output signal from the DAC unit 22 and a target value of the DAC unit 12, and calculates a distortion compensation value of the DAC unit 22 so that the calculated difference is zero. The storage controller 30 stores the calculated distortion compensation value for the current symbol in association with the pattern string containing the current symbol in the LUT 23 for the current ambient temperature. That is, the optical transmission apparatus 1A may calculate distortion compensation values for current symbols in, for example, 1,024 pattern strings for every different ambient temperature, and store distortion compensation values for every pattern string in the LUTs 23C for ambient temperatures.

Next, the operation process of the optical transmission apparatus 1C will be described. Upon detecting a current symbol from the coder 21, the first acquisition unit 24 generates a pattern string of interest including the current symbol and four symbols before the current symbol. The second acquisition unit 25C acquires a current ambient temperature via the temperature sensor 21 and selects a LUT 23C for the acquired ambient temperature. The second acquisition unit 25C looks up the selected LUT 23 for the current ambient temperature and acquires a distortion compensation value associated with the pattern string of interest. In addition, the converter 26 converts the current symbol in the pattern string of interest into a DAC setting value to acquire it.

The setting unit 27 adds the distortion compensation value for the current symbol acquired from the second acquisition unit 25 to the DAC setting value for the current symbol acquired from the converter 26 to calculate the DAC correction value. In addition, the setting unit 27 sets the DAC correction value of the DAC unit 22 to the calculated DAC correction value. The DAC unit 22 converts the current symbol into an analog signal based on the DAC correction value and outputs an output signal of the target value corresponding to the current symbol. As a result, the DAC unit 22 may output an output signal of the target value corresponding to the current symbol for the current temperature.

The optical transmission apparatus 1C according to the fourth embodiment calculates a distortion compensation value for every pattern string in all combinations taking into account ambient temperatures during the training process, and stores the distortion compensation values for every pattern string in the LUTs 23C for different ambient temperatures. During the operation process, the optical transmission apparatus 1C, upon detecting a current symbol, measures the ambient temperature and acquires a pattern string of interest containing the current symbol. The optical transmission apparatus 1C acquires a distortion compensation value for the current symbol in the pattern string of interest from a LUT 23C for the measured ambient temperature, and sets the DAC correction value of the DAC unit 22 to the distortion compensation value. Then, the DAC unit 22 may output an output signal of the target value corresponding to the current symbol based on the distortion compensation value for the current symbol and for the current temperature. As a result, the optical transmission apparatus 1C can compensate for a waveform distortion in non-linear components of the DAC unit 22 at the electrical domain as well as a distortion affected by the ambient temperature.

Figure 9:
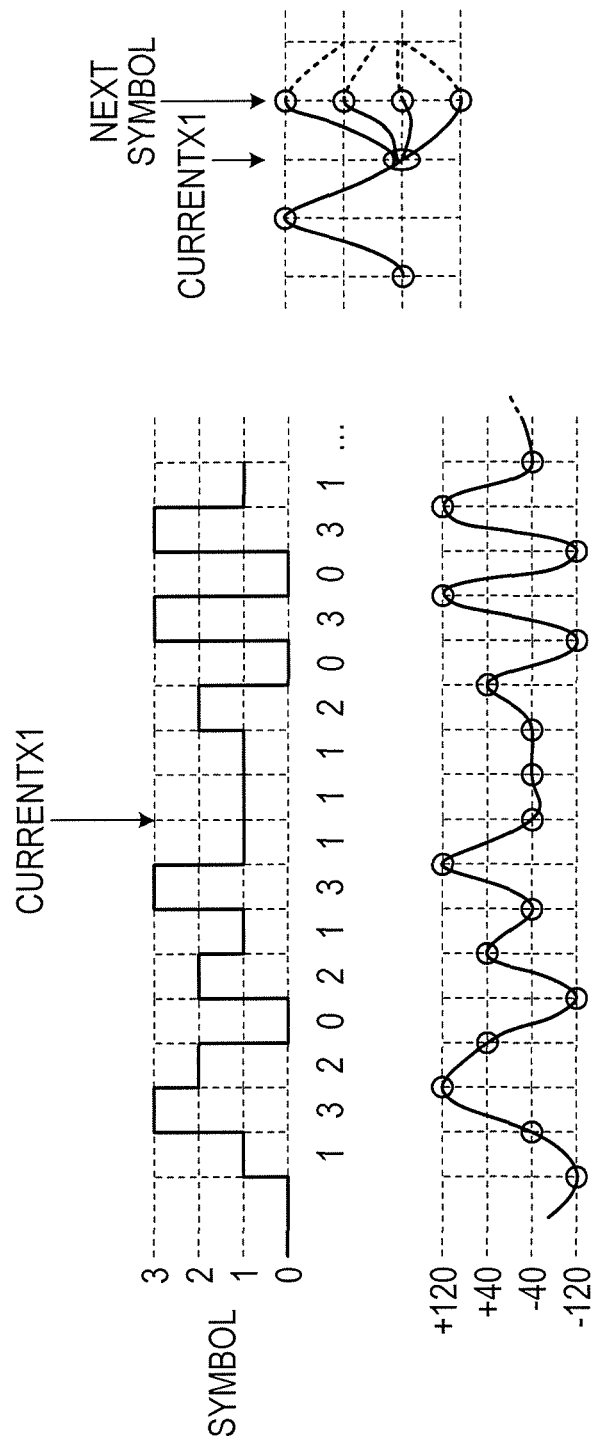
FIG. 9 is a diagram for illustrating an example of relationship between detection timing of a symbol and a compensation point.

In addition, the timing at which the first acquisition unit 24 detects a current symbol in a pattern string may be a timing where a sampling point X1 is delayed to a point after the symbol has been changed due to a response delay in a device, as illustrated in FIG. 9. Accordingly, it is necessary to take into account a change of a symbol which comes next to the current symbol in acquiring a distortion compensation value from a LUT 23. As an approach for coping with this issue, a fifth embodiment will be described.

Fifth Embodiment

Figure 10:
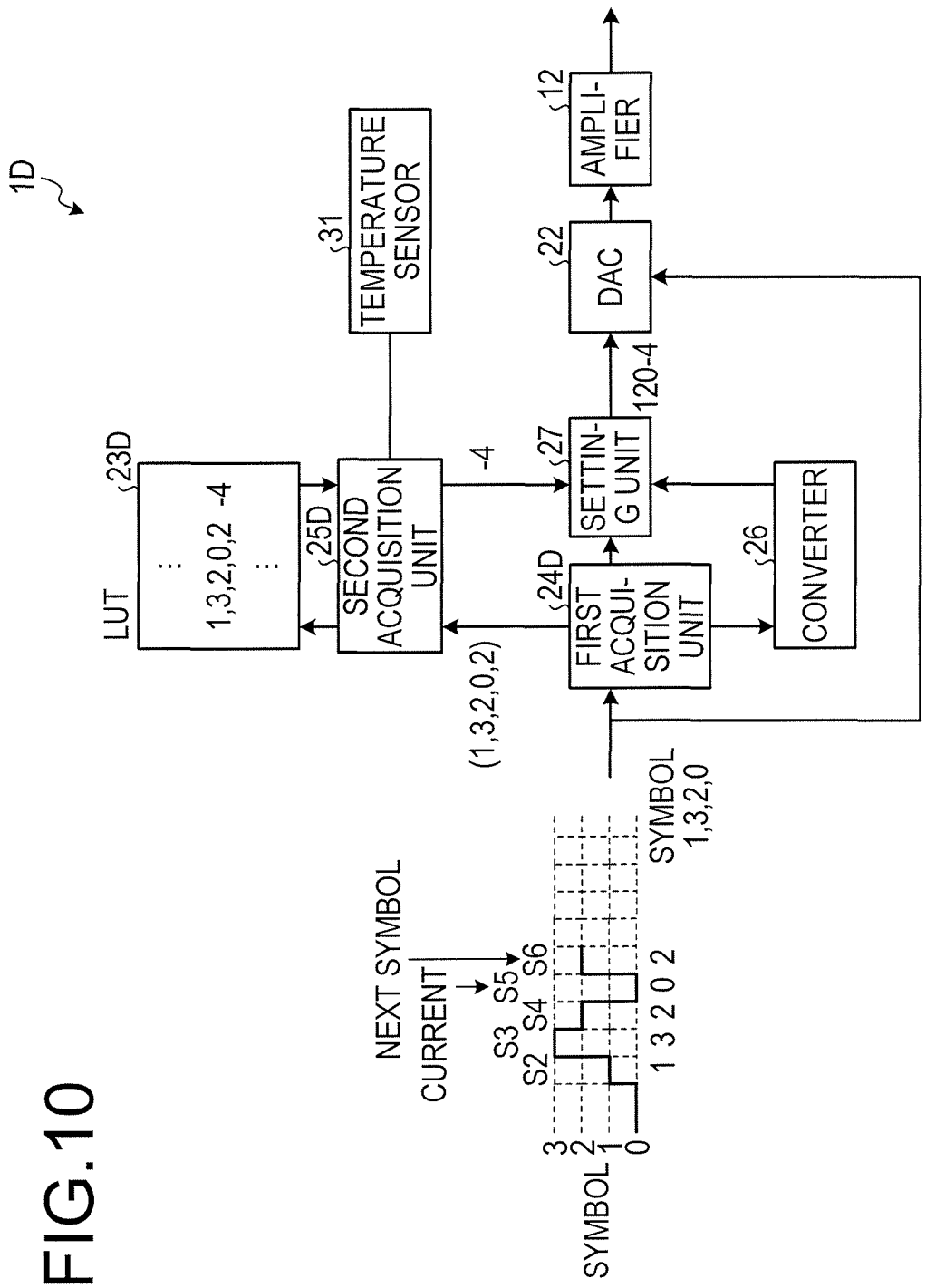
FIG. 10 is a diagram for illustrating an example of an optical transmission apparatus according to a fifth embodiment.

FIG. 10 is a diagram for illustrating an example of an optical transmission apparatus 1D according to a fifth embodiment. The same reference numerals to those used in FIG. 1 denote the same elements, and redundant descriptions of such elements will not be repeated.

The optical transmission apparatus 1D illustrated in FIG. 10 is different from the optical transmission apparatus 1 illustrated in FIG. 1 in that in the former, a pattern string of interest is composed of a symbol of interest, a symbol next to the symbol of interest, and three symbols before the symbol of interest.

The LUT 23D stores therein a distortion compensation value for a symbol of interest S5 in every pattern string including the symbol of interest S5, a symbol S6 next to the symbol of interest S5, and three symbols S4, S3 and S2 before the symbol of interest S5.

During an operation process, the first acquisition unit 24, upon detecting a symbol next to the symbol of interest, acquires a pattern string of interest including the symbol of interest, the symbol next to the symbol of interest, and three symbols before the symbol of interest. In the example illustrated in FIG. 10, the pattern string is, for example, "13202." The second acquisition unit 25D acquires a distortion compensation value associated with a pattern string of interest acquired by the first acquisition unit 24 from the LUT 23D.

Next, the operation of the optical transmission apparatus 1D according to the fifth embodiment will be described. A training process of the optical transmission apparatus 1D will be described first. Upon detecting a symbol next to the current symbol based on a training pattern from the coder 21, the first acquisition unit 24D acquires a pattern string of interest including the current symbol, the next symbol, and three symbols before the current symbol. The second acquisition unit 25D acquires the distortion compensation value of "0" for the current symbol in the pattern string of interest from the LUT 23D, and inputs the acquired distortion compensation value of "0" into the setting unit 27. The converter 26 converts the current symbol in the pattern string of interest into a DAC setting value to acquire the DAC setting value, and inputs the acquired DAC setting value into the setting unit 27.

The setting unit 27 adds the distortion compensation value of "0" for the current symbol to the DAC setting value of the current symbol to calculate a DAC correction value, and sets the DAC correction value of the DAC unit 22 to the calculated DAC correction value. Then, the DAC unit 22 converts the current symbol into an analog signal based on the DAC correction value and outputs an output signal. That is, since the distortion compensation value is "0," the DAC unit 22 outputs an output signal before distortion compensation associated with the current symbol.

An extraction unit 28A extracts an output signal from the amplifier 22 which corresponds to a current symbol. The calculator 29 calculates a difference between the extracted output signal from the DAC unit 22 and a target value of the DAC unit 12, and calculates a distortion compensation value of the DAC unit 22 so that the calculated difference is zero. The storage controller 30 stores the calculated distortion compensation value for the current symbol in the LUT 23 in association with the pattern string. That is, the optical transmission apparatus 1D may calculate a distortion compensation value for a current symbol in a pattern string, and store the distortion compensation value for the current symbol in the LUT 23C in association with every pattern string.

In addition, upon detecting a symbol next to another current symbol, the optical transmission apparatus 1D acquires a pattern string of interest including the current symbol, the next symbol, and three symbols before the current symbol. The optical transmission apparatus 1D calculates a distortion compensation value based on a different between an output signal from the DAC 22 which corresponds to the current symbol in the acquired pattern string of interest and a target value of the DAC 22. Then, the optical transmission apparatus 1D stores the calculated distortion compensation values for the current symbols in the LUT 23 in association with the respective pattern strings. For example, the optical transmission apparatus 1D may store distortion compensation values for symbol of interests in the LUT 23D in association with the respective 1,024 pattern strings.

Next, the operation process of the optical transmission apparatus 1D will be described. Upon detecting a symbol next to the current symbol from the coder 21, the first acquisition unit 24D acquires a pattern string of interest including the current symbol, the next symbol, and three symbols before the current symbol. The second acquisition unit 25D looks up the LUT 23 and acquires a distortion compensation value for the current symbol in the pattern string of interest. In addition, the converter 26 converts the current symbol in every pattern string of interest into a DAC setting value and acquires the DAC setting value associated with the current symbol. The setting unit 27 adds the distortion compensation value for the current symbol acquired from the second acquisition unit 25D to the DAC setting value for the current symbol acquired from the converter 26 to calculate the DAC correction value. In addition, the setting unit 27 sets the DAC correction value of the DAC unit 22 to the calculated DAC correction value. The DAC unit 22 converts the current symbol into an analog signal based on the DAC correction value and outputs an output signal of the target value from the current symbol.

The optical transmission apparatus 1D according to the fifth embodiment calculates distortion compensation values for every pattern string in all combinations during the training process, and stores the distortion compensation values for every pattern string in the LUT 23. Upon detecting a symbol next to the current symbol, the optical transmission apparatus 1D acquires a pattern string of interest including the current symbol, the next symbol, and three symbols before the current symbol. The optical transmission apparatus 1D acquires a distortion compensation value for the current symbol in the pattern string of interest from the LUT 23D, and sets the DAC correction value of the DAC unit 22 to the distortion compensation value. Then, the DAC unit 22 may output an output signal of the target value corresponding to the current symbol based on the distortion compensation value. As a result, the optical transmission apparatus 1D can compensate for a waveform distortion in non-linear components of the DAC unit 22 at the electrical domain even if the sampling point at which the current symbol is detected comes after a symbol has been changed.

Although not illustrated in the drawings, in the optical transmission apparatus 1 according to the first embodiment, an offset occurs between the DAC unit 22 and the amplifier 12 and between the amplifier 12 and the E/O converter 17, since capacitors for cutting DC components are disposed there. Moreover, since the optical transmission apparatus 1 detects a pattern string of symbols having a short period, an offset error may occur if "0s" or "1s" are unevenly contained in consecutive symbols. Accordingly, as an approach for canceling an offset created by DC cut, a sixth embodiment will be described.

Sixth Embodiment

Figure 11:
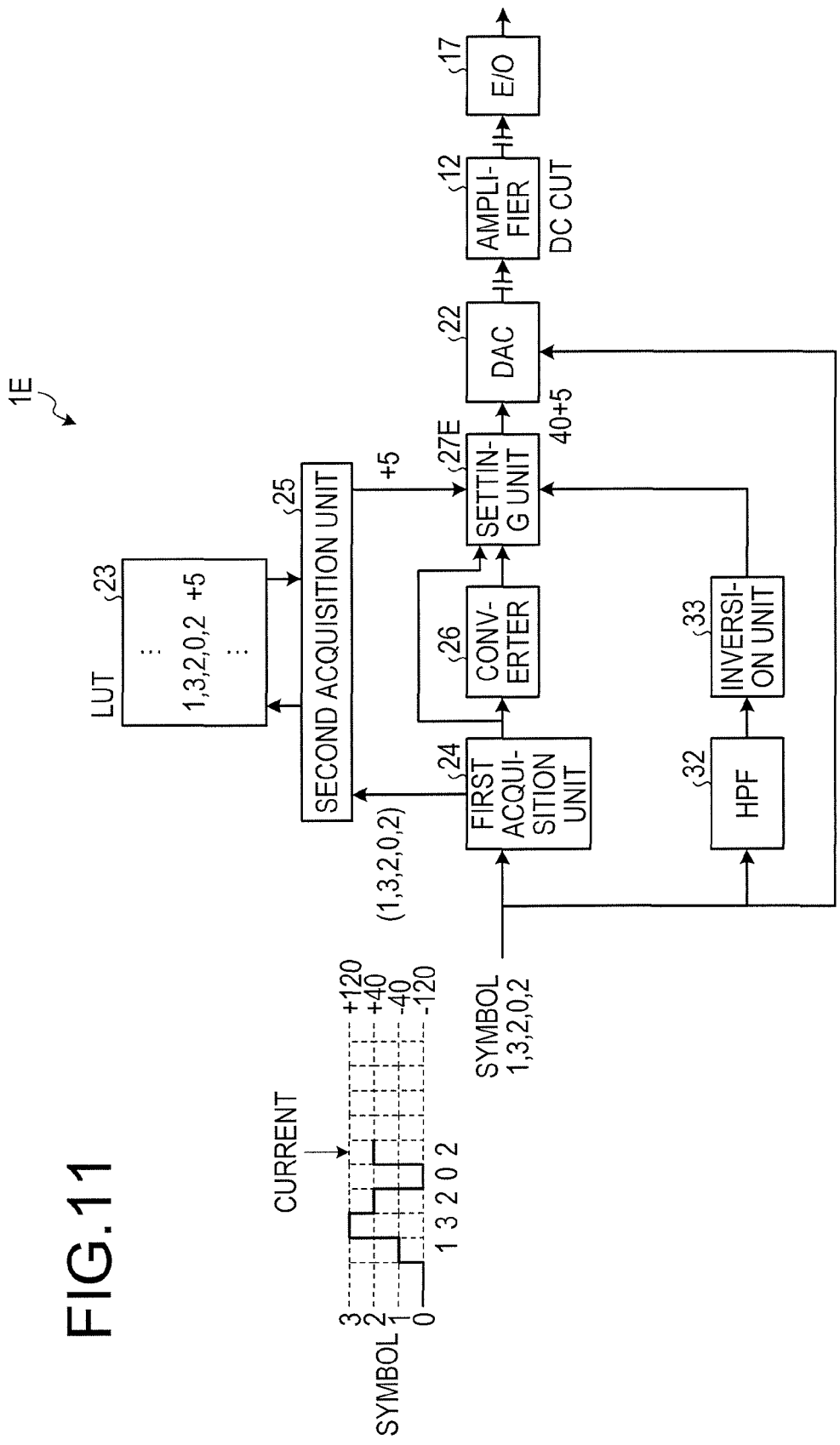
FIG. 11 is a diagram for illustrating an example of an optical transmission apparatus according to a sixth embodiment.

FIG. 11 is a diagram for illustrating an example of an optical transmission apparatus 1E according to a sixth embodiment. The same reference numerals to those used in FIG. 1 denote the same elements, and redundant descriptions of such elements will not be repeated.

The optical transmission apparatus 1E illustrated in FIG. 11 is different from the optical transmission apparatus 1 illustrated in FIG. 1 in that the former includes a HPF 32 for extracting high-frequency components of a symbol from the coder 21 and an inversion unit 33 for inverting the extracted high-frequency components. In addition, the optical transmission apparatus 1E inputs inverted components (low frequency components) from the inversion unit 33 into a setting unit 27E as a correction value.

The setting unit 27E receives a distortion compensation value for a current symbol in a pattern string acquired from the second acquisition unit 25 and a DAC setting value of a current symbol acquired from the converter 26 as input values. In addition, the setting unit 27E inputs a correction value for inverted components of the current symbol from the inversion unit 33 in order to cancel the amount of an offset in an analog signal generated by DC cut. Then, the setting unit 27E calculates the sum of the distortion compensation value for the current symbol, the DAC setting value of the current symbol and the correction value of the inverted component of the current symbol to calculate a DAC correction value, and sets the DAC correction value of the DAC unit 22 to the calculated value.

The DAC unit 22 may cancel the amount of an offset in lower frequency fluctuation generated by DC cut, convert the current symbol into an analog signal, and output an output signal of the target value corresponding to the current symbol, based on the DAC correction value. The amplifier 12 amplifies an output signal corresponding to the current symbol from the DAC unit 22. In addition, the E/O converter 17 converts the output signal corresponding to the current symbol, which has been amplified in the amplifier 12 into an optical signal to output it.

The optical transmission apparatus 1E according to the sixth embodiment adds the correction value of inverted components to the DAC correction value in addition to the distortion compensation value for the current symbol in the pattern string, to thereby cancel the amount of an offset in lower frequency fluctuation generated by DC cut of the current symbol.

Although a pattern string includes five symbols in total including a current symbol and four symbols before the current symbol in the first to fourth and sixth embodiments, the number of the symbols is not limited to four.

In addition, although a pattern string includes five symbols in total including a current symbol, the next symbol, and three symbols before the current symbol in the fifth embodiment, the number of the next symbols is not limited to one.

In addition, although the optical transmission apparatus using optical transmission has been described in the above embodiments, a radio frequency transmission apparatus using radio frequency transmission can also be employed.

Although the QAM scheme is used in the optical transmission apparatus in the above embodiments, the QAM scheme is not particularly limited to 16-QAM, 64-QAM, 256-QAM, etc., but may be changed appropriately.

In addition, elements need not necessarily be connected to one another physically as illustrated in the drawings. That is, the elements may be integrated with one another or divided into pieces functionally or physically depending on various loads or use conditions, and are not limited to those illustrated in the drawings.

Figure 12:
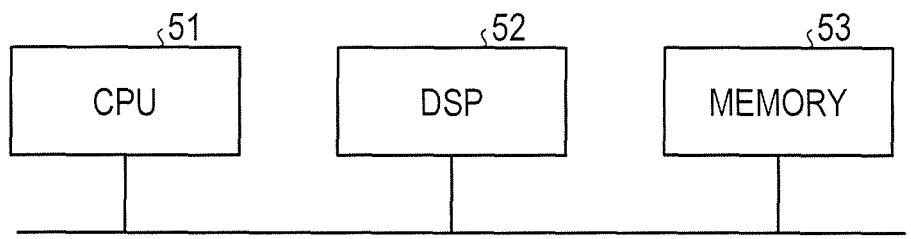
FIG. 12 is a block diagram for illustrating an example of hardware configuration.

FIG. 12 is a block diagram for illustrating an example of hardware configuration. The hardware configuration illustrated in FIG. 12 includes a central processing unit (CPU) 51, a digital signal processor (DSP) 52, and a memory 53. The memory 53 may be either a read-only memory (ROM) or a random-access memory (RAM) such as, for example, a synchronous dynamic random-access memory (SDRAM), a magneto-resistive random-access memory (MRAM), and a non-volatile memory (NVRAM). Some or all of a variety of functionalities performed on each of the devices such as the first acquisition unit 24, the second acquisition unit 25, the converter 26, the setting unit 27, the extraction unit 28, the calculator 29, and the storage controller 30 may be performed on the CPU 51 or the DSP 52. In addition, some or all of the variety of functionalities may be performed on a program executed by the CPU 51 or the DSP 52 or on hardware with a hard-wired logic circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device comprising:
at least one storage configured to store a distortion compensation value for each pattern string of a plurality of pattern strings, each pattern string including a symbol positioned at an end of the pattern string and a predetermined number of symbols positioned before the symbol positioned at the end of the pattern string;
at least one memory storing instructions; and
at least one processor that executes the instructions to provide:
a signal processing unit configured to perform signal processing on each pattern string of a plurality of pattern strings, a distortion in the signal processing unit being compensated by correcting the symbol positioned at the end of the pattern string to a target value based on the distortion compensation value,
a first acquisition unit configured to, upon detecting the symbol positioned at the end of the pattern string or a symbol positioned next to the symbol positioned at the end of the pattern string, acquire a respective pattern string of the plurality of pattern strings that includes the symbol positioned at the end of the pattern string and the predetermined number of symbols,
a second acquisition unit configured to acquire, from the at least one storage unit, the distortion compensation value that is associated with the respective pattern string of the plurality of pattern strings acquired by the first acquisition unit, and
a setting unit configured to set a correction value of the signal processing unit, the correction value being based on the distortion compensation value acquired by the second acquisition unit.

2. The distortion compensation device according to claim 1,
wherein the at least one processor executes the instructions to further provide:
a calculator configured to calculate a difference between an output signal corresponding to the symbol positioned at the end of the respective pattern string and the target value of the symbol positioned at the end of the respective pattern string, and to calculate the distortion compensation value based on the calculated difference; and
a storage controller configured to store the distortion compensation value calculated by the calculator in the at least one storage unit in association with the respective pattern string.

3. The distortion compensation device according to claim 1,
- wherein the predetermined number of symbols includes the symbol positioned next to the symbol positioned at the end of the pattern string, and
- wherein, upon detecting the symbol positioned next to the symbol positioned at the end of the pattern string, the first acquisition unit acquires the respective pattern string of the plurality of pattern strings including the symbol positioned at the end of the pattern string and the predetermined number of symbols.

4. The distortion compensation device according to claim 1,
- wherein the at least one processor executes the instructions to further provide:
  - a measuring unit configured to measure a current ambient temperature of the signal processing unit,
- wherein each of the at least one storage unit stores the distortion compensation values for each pattern string of the plurality of pattern strings for a different ambient temperature; and
- wherein the second acquisition unit acquires the current ambient temperature from the measuring unit, selects a respective storage unit of the at least one storage unit associated with the current ambient temperature, and acquires, from the respective storage unit, the distortion compensation value associated with the respective pattern string of the plurality of pattern strings acquired by the first acquisition unit.

5. A distortion compensation method comprising:
- storing, in at least one storage unit, a distortion compensation value for each pattern string of a plurality of pattern strings, each pattern string including a symbol positioned at the end of the pattern string and a predetermined number of symbols positioned before the symbol positioned at the end of the pattern string, wherein a distortion in a signal processing unit performing signal processing on each pattern string of the plurality of pattern strings is compensated for by correcting the symbol positioned at the end of the pattern string to a target value based on the distortion compensation value;
- upon detecting the symbol positioned at the end of the pattern string, acquiring a respective pattern string of the plurality of pattern strings that includes the symbol positioned at the end of the pattern string and the predetermined number of symbols;
- looking up the at least one storage unit;
- acquiring the distortion compensation value that is associated with the acquired pattern string from the at least one storage unit; and
- setting a correction value of the signal processing unit to the acquired distortion compensation value, by a processor.

* * * * *